Figure 1:
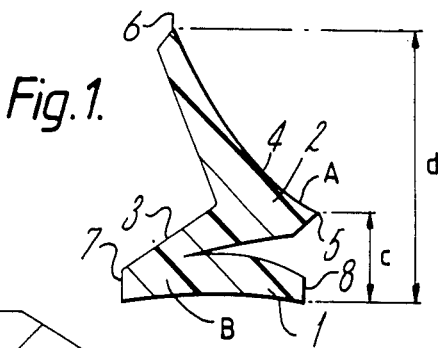

United States Patent [19]

Haaland

[11] Patent Number: 4,690,414
[45] Date of Patent: Sep. 1, 1987

[54] MEANS FOR SEALING THE GAP BETWEEN TWO AXIALLY DISPLACEABLE SEALING SURFACES

[75] Inventor: Per Haaland, Oslo, Norway

[73] Assignee: Mehren Rubber A/S, Kolbotn, Norway

[21] Appl. No.: 838,884

[22] PCT Filed: Jun. 19, 1984

[86] PCT No.: PCT/NO84/00025
§ 371 Date: Feb. 8, 1985
§ 102(e) Date: Feb. 8, 1985

[87] PCT Pub. No.: WO85/00210
PCT Pub. Date: Jan. 17, 1985

Related U.S. Application Data

[63] Continuation of Ser. No. 711,565, Feb. 8, 1985, abandoned.

[30] Foreign Application Priority Data

Jun. 20, 1983 [NO] Norway .................. 832235

[51] Int. Cl.⁴ .............................................. F16J 15/32
[52] U.S. Cl. .................. 277/207 A; 285/110; 285/230; 285/345; 277/152; 277/205
[58] Field of Search .......... 277/152, 165, 205, 207 A; 285/110, 111, 230, 231, 345

[56] References Cited

U.S. PATENT DOCUMENTS

| | | | |
|---|---|---|---|
| 2,365,048 | 12/1944 | Bruno | 285/110 X |
| 2,809,853 | 10/1957 | Nathan . | |
| 3,390,890 | 7/1968 | Kurtz | 285/231 X |
| 3,493,237 | 2/1970 | Kleindienst | 285/230 X |
| 3,558,144 | 1/1971 | Corbett et al. . | |
| 4,018,461 | 4/1977 | Bram | 285/110 |
| 4,103,901 | 8/1978 | Ditcher | 285/230 X |
| 4,188,040 | 2/1980 | Wolf et al. | 277/207 A X |

FOREIGN PATENT DOCUMENTS

| | | | |
|---|---|---|---|
| 530016 | 7/1931 | Fed. Rep. of Germany ... | 277/207 A |
| 1521032 | 3/1968 | France | 285/111 |
| 2447511 | 8/1980 | France | 285/110 |
| 571490 | 1/1958 | Italy | 285/110 |
| 85660 | 6/1955 | Norway | 285/110 |
| 877185 | 11/1981 | U.S.S.R. | 277/152 |

Primary Examiner—Robert S. Ward
Attorney, Agent, or Firm—Watson, Cole, Grindle & Watson

[57] ABSTRACT

A gasket for sealing the gap between two approximately parallel sealing surfaces which are displaced axially relative to each other during the assembly, during which the gasket follows one of the sealing surfaces and is compressed between said surface and the other sealing surface. The gasket body which is made of a soft elastic material, for example rubber, consists of two main parts (1) and (2) which are connected through a narrower connection part in such a manner that the sliding part (2) can pivot relative to the attachment part (1). To avoid a relative rotation of the gasket parts such that the assembly becomes unsuccessful, the axis of the connection part (3) extends diagonally from the point of attack (A) on the sliding part (2), towards the supporting surface (7) on the attachment part (1). The sliding part (2) may have a concave surface (4), and the connection piece (3) can have a less stiffness than the sliding part (2). The attachment part (1) can be connected to a reinforcement (17). Further, the sliding part (4) can be covered by a closed sliding jacket (18) having both ends attached to the front edge of the sliding part. A method of manufacturing a socket joint having a gasket mounted therein, comprises placing the gasket on a construction mandrel (16) on which the socket (14) is formed, the gasket being disposed in a prestressed state on the construction mandrel (16) for thereby expanding to a larger thickness upon removal of the mandrel.

4 Claims, 12 Drawing Figures

MEANS FOR SEALING THE GAP BETWEEN TWO AXIALLY DISPLACEABLE SEALING SURFACES

This application is a continuation of application Ser. No. 711,565, filed Feb. 08, 1985, now abandoned.

The present invention relates to a type of gasket which is adapted for sealing the gap between two approximately parallel sealing surfaces for example, a pipe and associated socket, which, during the assembly, are displaced axially relative to each other such that the gasket is compressed therebetween. The invention also relates to a method for manufacturing pipes in which the gasket is included as a part thereof.

There are great number of known types of gaskets which are to be used for the above purpose in which the gasket profile substantially consists of two main parts which are tied together through a connection piece of narrower width.

The first main body of the gasket profile can be designated "the attachment part" and is mounted undisplaceably on the one sealing surface. The other main body which can be designated "the sliding part", is disposed outside the first and is provided with more or less marked sealing lips which point in both directions relative to the axis of the gasket.

The distance between the main bodies of the gasket is smallest at the insertion side of the gasket. The purpose is that the gasket will have such a large opening that a pipe can be pushed thereinto, whereafter the pipe will abut against the concave surface of the sliding part, and because this is connected to the first stationary attachment part with the thin intermediate piece, the sliding part will pivot about the intermediate piece so that both sides of the concave sliding surface with the sealing lips will abut against the pipe pushed thereinto, and sealing is thereby established in both directions. Among other known gaskets having aproximately similar function are those mentioned in Norwegian Patent Specification No. 137400, U.S. Pat. Nos. 2,809,853 and 3,158,376, and British Patent Specification No. 154,409.

Gaskets in accordance with the above-mentioned patent specifications and also others of the same group, function largely satisfactorily if the gasket is in some manner, very securely attached to one of the sealing surfaces, for example, by having an especially broad abutment surface or by mounting the gasket in a relatively deep groove adapted therefor. If the attachment does not function satisfactorily, the gasket profile will, even if it is supplied with a lubricant on the surface, due to the friction existing between the pipe and the gasket, still be apt to pivot about its own axis such that the assembly becomes unsuccessful. Attempts to counteract this effect by connecting the gasket parts more or less offset relative to the axis of the gasket or the profile have not been satisfactory in this respect.

However, experiments have shown that this problem can be solved in a satisfactory manner, and this invention which in the following is to be further described with reference to the drawings, is intended to provide a gasket profile in which the above-mentioned disadvantages are eliminated through engaged in the sealing efficiency.

Figure 2:
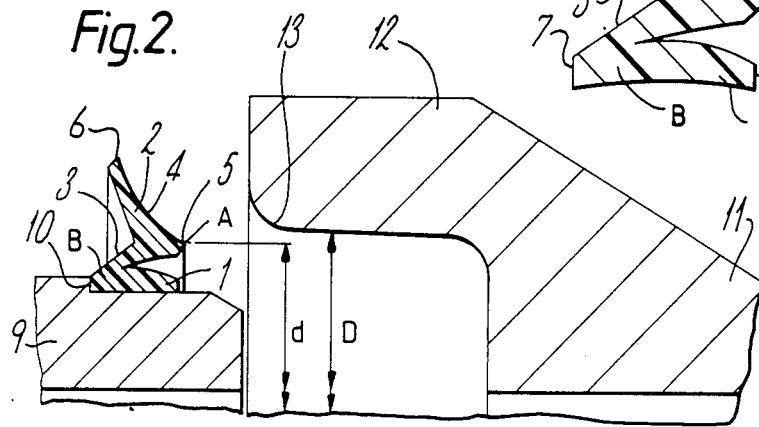
Figure 3:
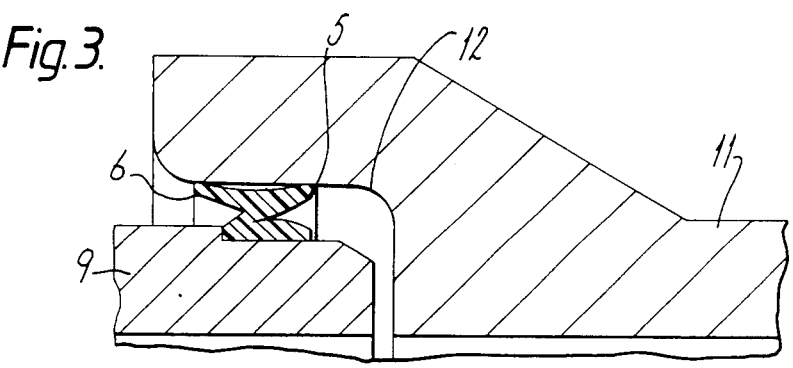
Figure 4:
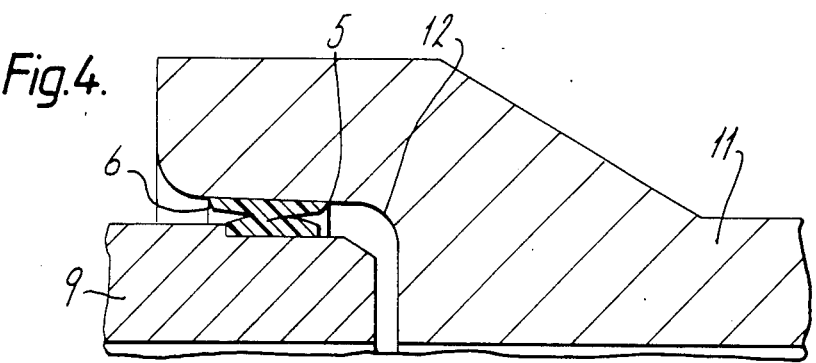
Figure 5:
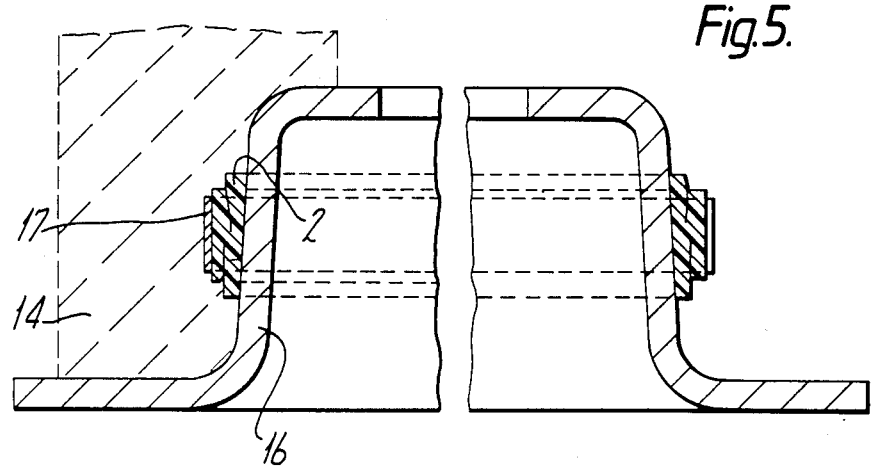
Figure 6A:
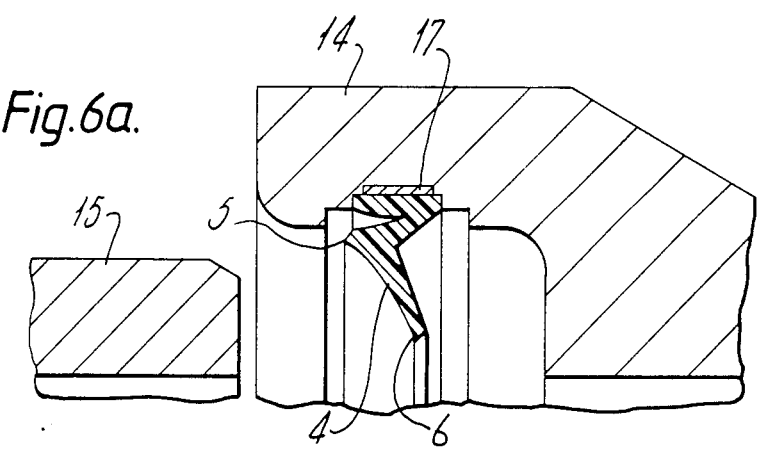
Figure 6B:
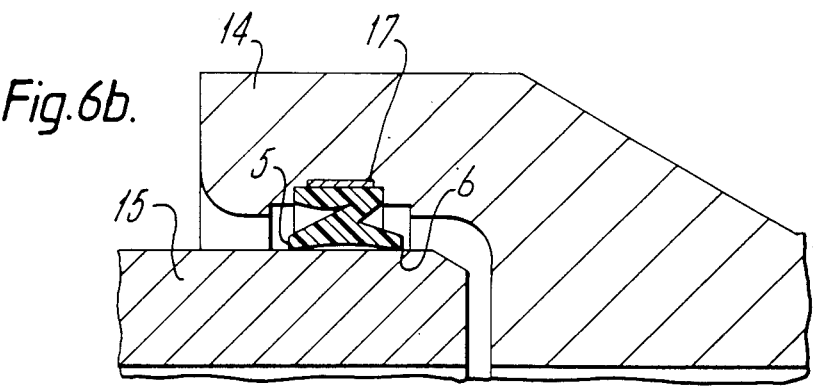
Figure 7A:
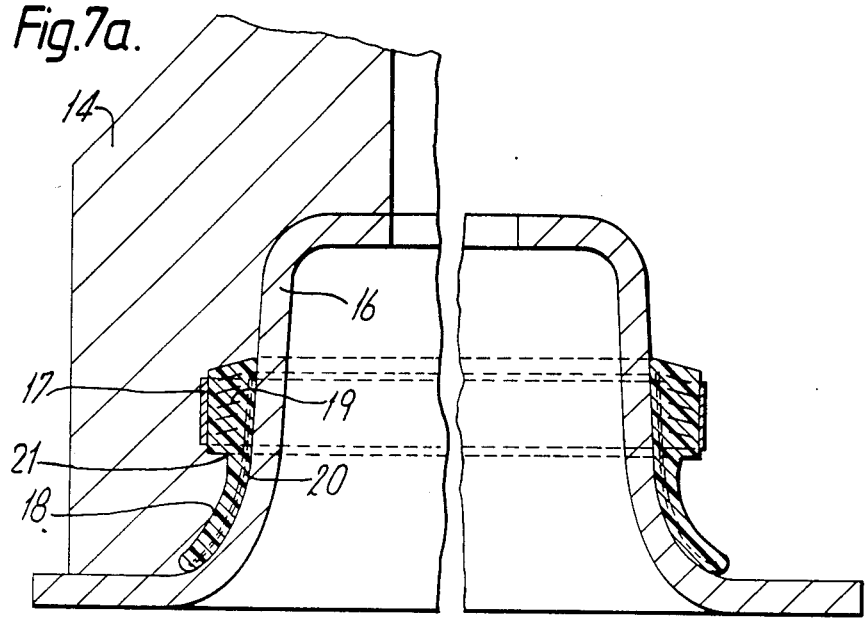
Figure 7B:
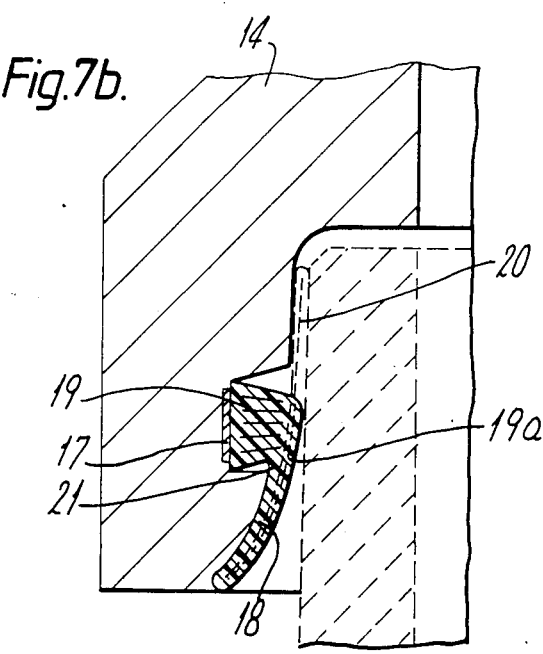
Figure 8:
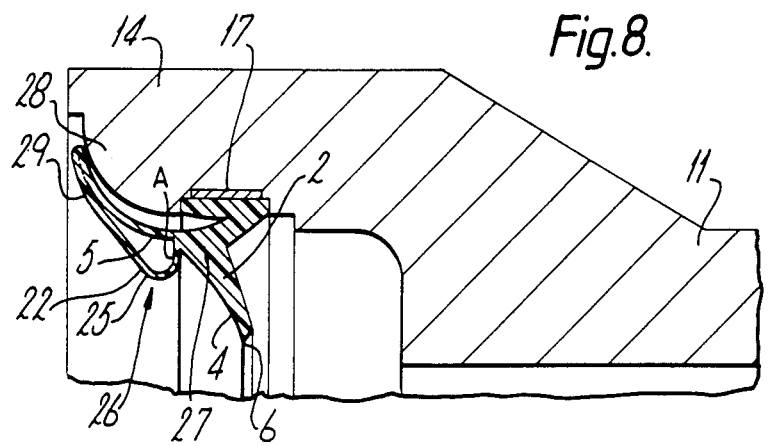

In the drawings,

FIG. 1 is a cross-sectional view of one embodiment of a gasket according to the invention, FIGS. 2-4 are cross-sectional views illustrating the assembly of the gasket of FIG. 1 between two pipes, FIG. 5 is a cross-sectional view of a mandrel on which the gasket of the invention may be manufactured, FIGS. 6a and 6b are cross-sectional views illustrating a mode of assembly between two pipes for another embodiment of the gasket, FIGS. 7a and 7b are cross-sectional views of mandrel used for constructing the gasket shown in FIGS. 6a and 6b, and FIGS. 6-10 are cross-sectional views showing the assembly of another embodiment of the gasket according to the invention.

Turning now to FIG. 1 which is a section through a first embodiment of the gasket profile, the gasket is constructed from three main elements, attachment part 1, sliding part 2 and inclined connection part 3 therebetween.

An attachment part 1 can have a special shape, so that it matches a groove or similar, adapted thereto, but generally it will have a width which is substantially greater than its height and it will preferably have a concave abutment side and end surfaces 7 and 8 with abrupt corners.

Sliding part 2 has concave surface 4 which can be evenly curved or for example, can consist of several inclined surfaces. End surfaces 5 and 6 should preferably define acute angles together with surface 4 so as to provide outwardly protruding sealing lips. To facilitate the insertion of one of the sealing surfaces into the other, sliding part 2 has an inclined position relative to the attachment part 1, so that the gasket height C is substantially less than the gasket height d.

Connection part 3 is attached to sliding part 2 at the front edge of the gasket in the proximity of the point of attack A and extends therefrom obliquely downwards towards inner surface 7 of the attachment part 1 with an angle of 45° or less. The twisting force which influences the gasket in the direction of the arrow in the proximity of A, will then via connection part 3 be directed towards supporting surface and limiting surface 7 of the attachment part 1, so that the gasket will be given a pivot point close to point B, and the connection part which has a greater length than the pivot radius, will act as a thrust bar and prevent rotation of the profile.

FIG. 2 illustrates a gasket mounted on spigot end pipe 9. For the fixing of the gasket on pipe 9 a step 10 is provided. A second pipe 11 having socket 12 is to be pushed on the end pipe 9. Socket 12 has a somewhat larger diameter D than the diameter d of the gasket and is additionally provided with a radius of entrance 13.

As socket 12 is pushed onto sliding part 2 of the gasket, it will strike inclined concave sliding surface 4 thereof. Because connection part 3 has less sectional area than attachment and sliding parts 1 and 2, respectively, the sliding part will pivot thereabout close to the attachment point B. Since this point is at a maximum distance from the point of attack A, the efficiency of the pivot movement which causes an increased thickness will be at a maximum at the point of attack A. Sealing lips 5 and 6 will thereby generate a sufficient sealing pressure even if the gap between the pipe 9 and the socket 12 should be substantially larger than the nominal dimension thereof as is illustrated in FIG. 3.

Due to its structure the gasket can also be used, even if the gap between the sealing surfaces is substantially narrower than predicted. The approximate Z-shape of the gasket profile will then, as is illustrated in FIG. 4, be converted to a flat compressed Z-shape, substantially by bending the material, and the sealing pressure will therefore not increase above acceptable values.

Of course the gasket can also be used having the attachment part, fixedly connected to socket 14 as this is illustrated in FIGS. 6a and 6b where spigot end 15 is being pushed into the gasket.

An embodiment of this method of joining, which is of special interest, involves a system for manufacturing the socket of the pipe where the gasket, as illustrated in FIG. 5, is mounted and compressed on construction mandrel 16 with its sliding part 2 in contact therewith, on the outside of which mandrel socket 14 of the pipe thereafter is constructed. After cooling or curing, mandrel 16 is pulled out of the socket so that the gasket is released and takes the shape as illustrated in FIGS. 6a and 6b, the pipe then being ready for use.

However, if the gasket is to be used in such a sealing system, the gasket must be prevented from being stretched when being mounted outside the construction mandrel 16. The gasket must therefore be provided with a non-stretchable reinforcement 17. If this has a diameter which is adapted to the circumstances, the gasket will take a prestressed and compressed position as illustrated in FIG. 5. As previously described the gasket will then regain its original shape as soon as the construction mandrel 16 is removed.

In addition to its primary function which is to compress the profile, external reinforcement ring 17 also constitutes a substantial expedient for improving the pipe structure. Because the reinforcement is designed to absorb the maximum gasket pressure which can develop, the designer of the pipe needs no longer to take into consideration the uncertainty associated with which load this will give on the socket.

The designer is therefore able to reduce the dimensions of the materials considerably when he only needs to give due consideration to the transverse forces and the like which influence the socket.

The embodiment including an external reinforcement ring for gaskets which in a precompressed state are built into the socket, during the manufacturing of a pipe, can of course be used for other compression gaskets, for example of that type which is illustrated in FIGS. 7a and 7b and consequently is not bound to the first described embodiment.

When in use, the gaskets of the type illustrated in FIG. 1 must be provided with an appropriate lubricant on surface 4 before the assembly. For the elimination thereof, the gaskets can be provided with a closed sliding jacket of the type described in U.S. Pat. No. 4,299,399, in which jacket 18 in FIG. 7 slides across the sliding surface 4-19a of the gasket body during the assembly and forms a double supporting layer 20 as a continuation of the gasket.

Especially in connection with the application of the gasket when this is mounted on a construction mandrel it may be unfavourable that it in this case must be compressed too strongly, primarily because this may make it difficult for the mounting thereof on the construction mandrel. In such a case, it would be more convenient if the gasket could have its thickness of material increased, and thereby its compression during the assembly of the pipes.

If a relatively long assembly movement is acceptable and if there at the same time is sufficient gap space inside the body of the gasket, such a gasket thickness can be achieved by increasing the thickness of the sliding gasket 18 towards its connection 21 to the gasket body 19.

The long sockets which will be necessary for achieving anything essential by this approach, are however frequently not desired, and a substantially larger increase of thickness can be achieved by another and newly developed embodiment of the above closed sliding jacket. This embodiment will be further described in the following, reference being had to FIG. 8.

Sliding jacket 22 which, in this embodiment, is provided with an increasing thickness, is at its thickest end attached to the front side of the body 5-19c in the same manner as in FIGS. 7a and 7b, and the other end of jacket 22, which preferably has bulge 25, is attached to the point of attack A of the gasket body in such a manner that the bulge 25 obtains a diameter 26 which is less than the diameter 27 of the gasket body. largest width of the sliding jacket 22 extends forwardly and outwards towards socket opening 28. The inner surfaces of sliding jacket 22 which may be supplied with locking ribs 29, is in known manner provided with a suitable lubricant.

When pipe 9 is pushed into socket 14, it will strike double sliding jacket 22 at bulge 25 thereof, and the bulge will follow the movement of the pipe inwardly along gasket body 2-19, whereas the lubricated inner surfaces 29 will slide relative to each other, the jacket at the same time rolling across the gasket body and forming a double layer thereover. The thickness of the material and the compression will then increase corresponding to two jacket thickness dimensions in the sealing gap.

Figure 9:
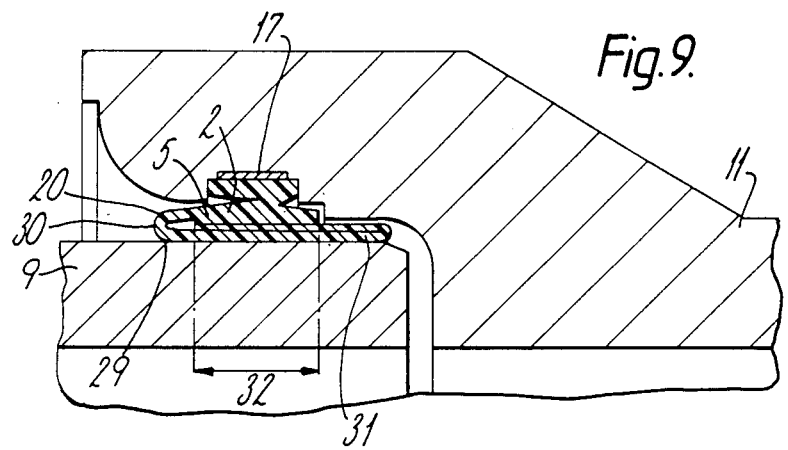
Figure 10:
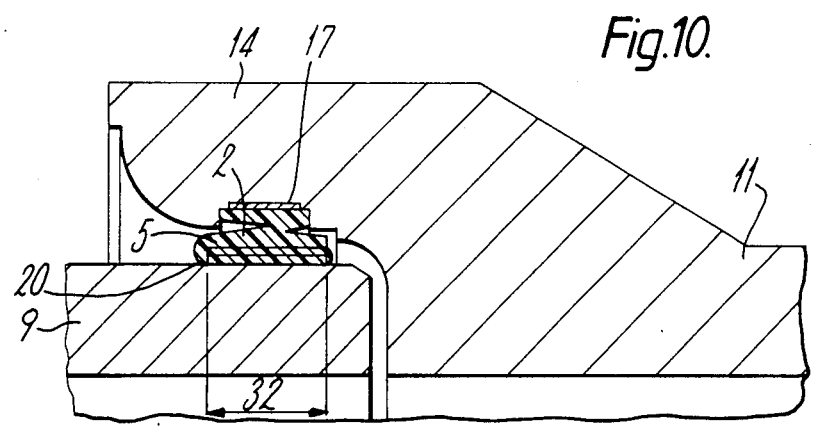

By adapting the width of the sliding jacket and the length of the assembly movement it is also by this embodiment possible to achieve a supporting layer 30-31, which may extend beyond sealing width 32 in one or both directions. In addition, this embodiment can provide the jacket 22 with such a width that when it is inserted by the pipe 9, only a double jacket layer 20 across sealing width 32 results, so that the gasket also can be used even if no gap is available inside the sealing gap as is illustrated in FIGS. 9 and 10.

From the description it will appear that this embodiment of a closed double sliding jacket is especially favourable in the described example, but the invention is not limited thereby, but can be used in connection with any other appropriate gasket structure.

For example, there can also be used a closed double sliding jacket in connection with that type of lamellae gasket illustrated in FIGS. 7a and 7b, the sliding jacket being attached only to one point of the gasket body, for example in the area 17. During assembly, the inner jacket surfaces will then slide relative to each other, the portion of the gasket surface resting against the gasket body, i.e. the inner portion, being relatively stationary in relation to the gasket body, whereas the outer portion will slide along the inner.

I claim:

1. Gasket for sealing the gap between two approximately parallel first and second sealing surfaces which during assembly are displaced axially relative to each other, such that the gasket follows the first sealing surface and is compressed between said first sealing surface and the second sealing surface, said gasket being of the type in which the gasket body is made of a soft elastic material, the gasket body comprising an annular sliding part and an annular attachment part, one part being within the other part, the attachment part and the sliding part being connected through a connection part having a thickness less than the attachment part and the sliding part such that the sliding part can pivot relative to the attachment part, the axis of the connection part extending diagonally from a point of attack on one edge of the sliding part to a supporting surface on an opposite edge of the attachment part such that, in cross-section, the gasket body has a Z-type general configuration, the sliding part being inclined relative to attachment part such that the edge of the sliding part with the point of attack is nearer the attachment part than the remainder of the sliding part, the gasket being oriented relative to the sealing surfaces such that the point of attack of the sliding part is nearer to the second sealing surface prior to assembly than is the opposite edge of the attachment part.

2. Gasket as stated in claim 1, wherein the sliding part has a concave exterior surface.

3. Gasket as stated in claim 1, wherein the connection part has less stiffness than the sliding part.

4. Gasket as stated in claim 1, wherein the attachment part is connected to a reinforcement.

* * * * *